(12) United States Patent
Smith

(10) Patent No.: US 8,083,237 B2
(45) Date of Patent: Dec. 27, 2011

(54) TUBE SEAL COMPONENTS

(75) Inventor: Timothy T. Smith, Indianapolis, IN (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 12/772,569

(22) Filed: May 3, 2010

(65) Prior Publication Data

US 2010/0207332 A1 Aug. 19, 2010

Related U.S. Application Data

(62) Division of application No. 12/299,393, filed as application No. PCT/US2007/012066 on May 21, 2007.

(60) Provisional application No. 60/804,748, filed on Jun. 14, 2006.

(51) Int. Cl.
 F16L 17/00 (2006.01)
 F16J 15/02 (2006.01)
 F16J 15/08 (2006.01)

(52) U.S. Cl. .................. 277/616; 277/648; 277/651

(58) Field of Classification Search .......... 277/606–609, 277/612, 616, 626–627, 634–635, 648, 651
See application file for complete search history.

(56) References Cited

U.S. PATENT DOCUMENTS

| | | | |
|---|---|---|---|
| 2,519,436 A | 8/1950 | Cadman | |
| 2,974,684 A | 3/1961 | Ginaven et al. | |
| 3,602,531 A | 8/1971 | Patry | |
| 3,884,510 A | 5/1975 | Bram et al. | |
| 3,915,481 A | 10/1975 | Marsh, Jr. | |
| 3,979,130 A | 9/1976 | Cowie et al. | |
| 3,995,888 A | 12/1976 | McIlroy | |
| 4,242,164 A | 12/1980 | Skinner | |
| 4,327,891 A * | 5/1982 | Allen et al. | 251/38 |
| 4,657,285 A | 4/1987 | Akiyama et al. | |
| 4,664,800 A | 5/1987 | Raines et al. | |
| 4,763,695 A | 8/1988 | Dooley | |
| 4,905,736 A | 3/1990 | Kitami et al. | |
| 5,078,211 A | 1/1992 | Swineford | |
| 5,330,156 A | 7/1994 | McKavanagh et al. | |
| 5,338,070 A | 8/1994 | Horikawa et al. | |
| 5,398,976 A | 3/1995 | Webb | |
| 5,456,475 A | 10/1995 | Abraham et al. | |
| 5,649,713 A | 7/1997 | Ledgerwood | |
| 5,685,345 A | 11/1997 | Gieseke et al. | |
| 5,851,036 A * | 12/1998 | Vanesky | 285/294.1 |
| 5,884,669 A | 3/1999 | Braun et al. | |
| 6,112,952 A | 9/2000 | Hess, III et al. | |
| 6,155,302 A | 12/2000 | Fischerkeller et al. | |

(Continued)

FOREIGN PATENT DOCUMENTS

DE 003418718 11/1985

(Continued)

*Primary Examiner* — Vishal Patel

(74) *Attorney, Agent, or Firm* — Harness, Dickey & Pierce, P.L.C.

(57) ABSTRACT

A tube seal is provided including a rigid cylindrical tube and an elastomeric seal body molded to the outer surface of the cylindrical tube. The rigid cylindrical tube includes a recessed annular groove at each end thereof for receiving the elastomeric seal body therein to create a mechanical connection to resist the seal body from being pulled away from the cylindrical tube. The tube seal is also incorporated into a diameter reducing tube seal, an integrated tube seal and filter design and an integrated tube seal and valve design.

11 Claims, 6 Drawing Sheets

U.S. PATENT DOCUMENTS

| | | |
|---|---|---|
| 6,290,240 B1 | 9/2001 | Knapp et al. |
| 6,408,890 B1 | 6/2002 | Mori et al. |
| 6,439,620 B1 * | 8/2002 | Guest .......................... 285/347 |
| 6,548,760 B1 | 4/2003 | Stout, Jr. |
| 6,705,615 B2 * | 3/2004 | Milberger et al. ............ 277/328 |
| 6,709,575 B1 | 3/2004 | Verdegan et al. |
| 6,769,721 B2 | 8/2004 | Guest et al. |
| 6,800,108 B2 | 10/2004 | Noda et al. |
| 6,824,117 B2 | 11/2004 | Horton et al. |
| 6,923,908 B1 | 8/2005 | Thompson et al. |
| 6,962,373 B2 | 11/2005 | Houghton |
| 2007/0267824 A1 * | 11/2007 | Baugh et al. .................. 277/607 |

FOREIGN PATENT DOCUMENTS

| | | |
|---|---|---|
| DE | 019548249 | 6/1997 |
| DE | 019902953 | 8/2000 |
| EP | 000617221 | 9/1994 |
| GB | 2094443 | 9/1982 |
| WO | 2007/145779 | 12/2007 |

* cited by examiner

TUBE SEAL COMPONENTS

CROSS-REFERENCE TO RELATED APPLICATIONS

This application is a divisional of U.S. application Ser. No. 12/299,393 filed Nov. 3, 2008, which is a National Stage of International Application No. PCT/US2007/012066, filed May 21, 2007, which claims priority to U.S. Provisional Application No. 60/804,748, filed Jun. 14, 2006, the disclosures of which are incorporated herein by reference.

FIELD

The present disclosure relates to tube seal components for sealingly connecting two components.

BACKGROUND AND SUMMARY

The statements in this section merely provide background information related to the present disclosure and may not constitute prior art.

Historically, the standard method of sealing two joints not directly connected to each other has been to use a tube with an o-ring at each end. This design has been found to have two main deficiencies; the first being the seal's inability to compensate for offset between the two bores and the second being various assembly issues including missing o-rings, cut o-rings, rolled o-rings and overall labor intensive.

An improvement to this sealing solution was patented in Europe (DE19548249C2 and DE19902953A1) by FDS Reichelsheim by directly molding rubber to an adhesive covered tube. This technique allowed for large seal beads to be incorporated into the design which would allow for misalignment in the application as well elimination of the majority of assembly issues found with the tube and o-ring design. The deficiency with this design is the reliance on the adhesive bond between the tube and the rubber which has the bond failure modes already specified.

Current design tube seals are 100 percent reliant on rubber to metal adhesion for proper function. Adhesive to metal bond failure has resulted in field failures of tube seals utilizing straight wall designs. Several failure modes have been found to cause this condition including initial metal surface condition, inadequate metal preparation, adhesive thickness, adhesive age, adhesive "sweep" during molding and mold release "sweep" during molding. Adhesive "sweep" is caused by the injection of rubber into the mold that flows parallel to the wall of the tube and "sweeps" away the adhesive that is applied to the wall so that the adhesive is pushed toward the bottom of the seal.

The present disclosure provides a tube seal, comprising: a rigid cylindrical tube including a recessed annular groove provided in an outer surface thereof at each end of the cylindrical tube; and an elastomeric seal body molded to the outer surface of the cylindrical tube so as to be received in the recessed grooves, the seal body including a raised seal bead portion at each end of the seal body. The elastomeric material received in the recessed grooves of the rigid tube removes the reliance solely on rubber adhesion to achieve acceptable seal performance and still retains the benefits of an over-molded tube seal design.

The mechanical bead lock feature incorporated into the supporting insert results in an elastomer ring that provides sufficient interference with the insert to allow for proper installation of the seal into the application with no adhesive bond between the insert and elastomer required. The mechanical bead lock feature also results in sufficient elastomer compression to provide adequate sealing in the application with no adhesive bond between the insert and elastomer required.

The present disclosure also provides a diameter reducing tube seal that connects a larger bore to a smaller bore and incorporates an inner diameter which transitions from a smaller diameter to a larger diameter. The transition is in such a manner as to minimize the effect on pressure and flow of the media passing through the seal regardless of flow direction. In particular, the disclosure includes a diameter reducing tube seal, comprising: a generally conically shaped rigid insert having a first opening at a first end and a second opening at a second end, said first opening being larger in diameter than said second opening; and an elastomeric seal body molded to said rigid insert and including annular raised bead portions surrounding each of said first and second openings.

The present disclosure also incorporates an integrated filter device in a tube seal according to the present disclosure. In particular, the present disclosure provides a tube seal and integrated filter, comprising: a rigid cylindrical tube having a first opening at a first end and a second opening at a second end thereof; an elastomeric seal body is molded to the outer surface of the cylindrical tube, the seal body including a raised seal bead portion at each end of the seal body; and a filter member disposed in the rigid cylindrical tube.

The present disclosure also incorporates a valve structure molded inside of a tube seal for providing directional or pressure control of the media passing through the seal. In particular, the present disclosure includes a tube seal, comprising: a rigid cylindrical tube having a first opening at a first end and a second opening at a second end thereof; an elastomeric seal body is molded to the outer surface of the cylindrical tube, the seal body including a raised seal bead portion at each end of the seal body; and an elastomeric duck-bill valve molded inside of the rigid cylindrical tube.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
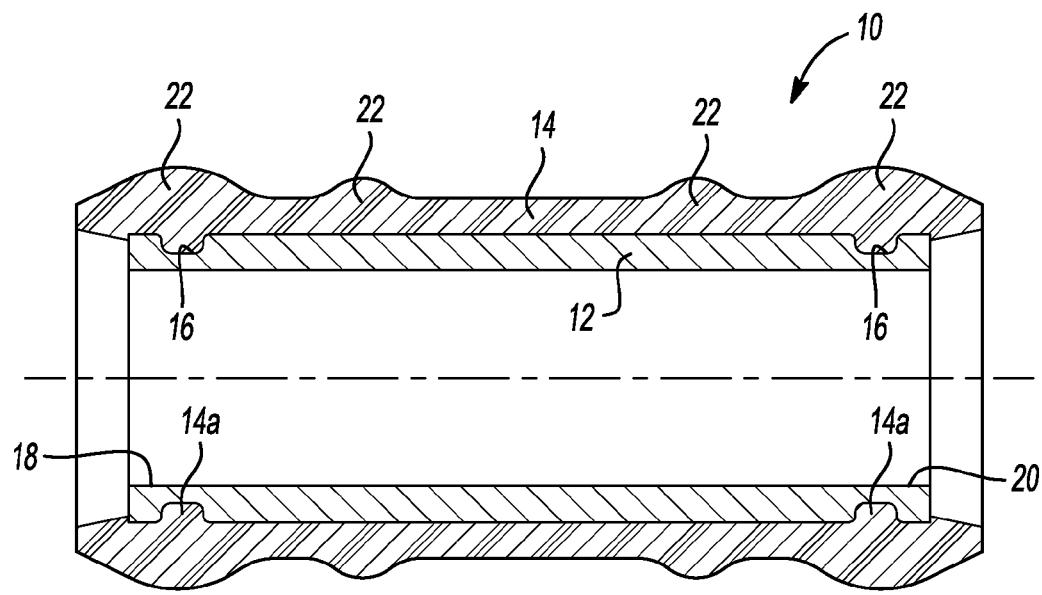
FIG. 1 is a cross-sectional view of a tube seal according to the principles of the present disclosure.

The following description is merely exemplary in nature and is not intended to limit the present disclosure, application, or uses. It should be understood that throughout the drawings, corresponding reference numerals indicate like or corresponding parts and features.

Figure 2:
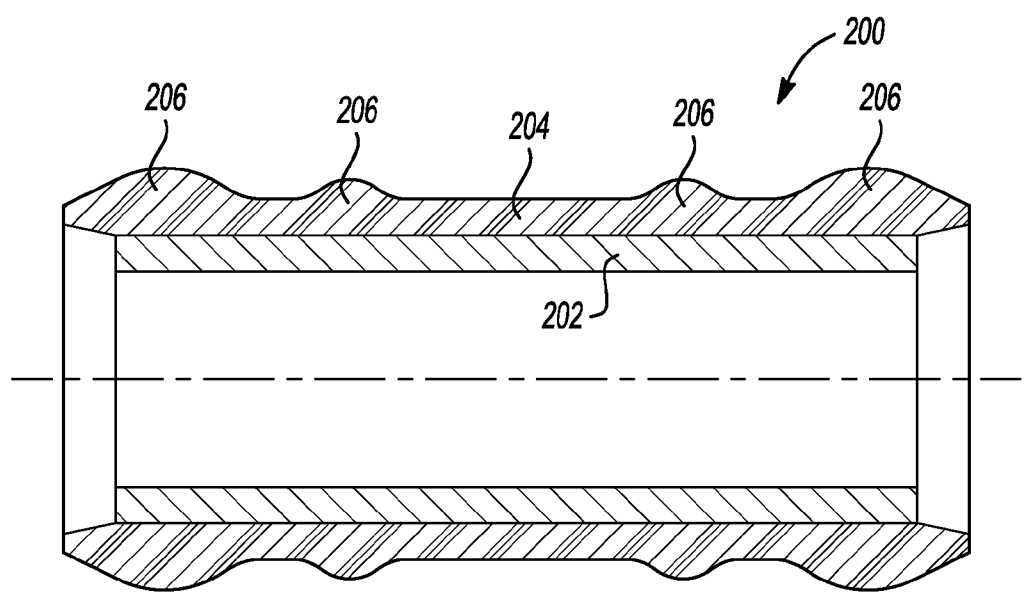
FIG. 2 is a cross-sectional view of a prior art tube seal.

FIG. 2 shows a prior art tube seal 200 including a metal cylindrical tube 202 and an elastomeric seal body 204 molded to an outer surface of the cylindrical tube 202. The elastomeric seal body includes raised bead portions 206 on each end thereof. A problem with the prior art design is that adhesive bond between the tube 202 and the seal body 204 is subject to failure.

With reference to FIG. 1, a tube seal 10 according to the principles of the present disclosure will now be described. The tube seal 10 includes a rigid cylindrical tube 12 and an elastomeric seal body 14 molded to an outer surface of the rigid cylindrical tube 12. The rigid cylindrical tube 12 can be made from metal, plastic, or other rigid materials.

Figure 3:
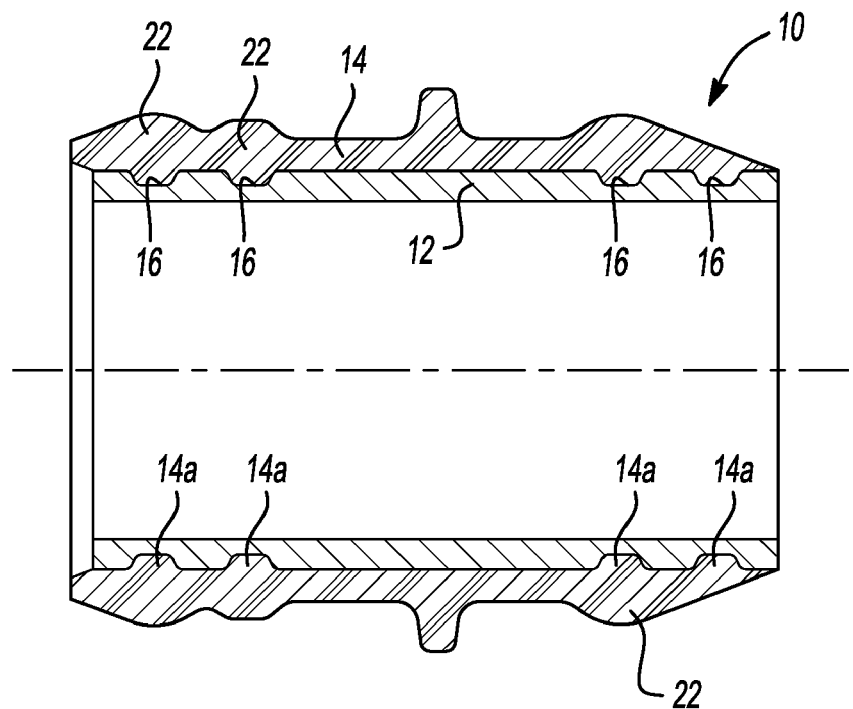
FIG. 3 is a cross-sectional view of a tube seal according to a second embodiment.

The metal cylindrical tube 12 includes a recessed annular groove 16 in an outer surface thereof at each end 18, 20. It should be understood that multiple recessed grooves 16 can be used at each end 18, 20 of the cylindrical tube 12, as illustrated in FIG. 3, wherein a pair of recessed grooves 16 are provided at each end 18, 20.

The elastomeric seal body 14 is molded to the rigid cylindrical tube 12 so as to be received in the recessed annular grooves 16. The grooves 16 provide an interrupted bonding surface, preventing or reducing adhesive "sweep" during molding of the elastomeric seal body 14 to the tube 12, allowing for an improved rubber to tube bond. The grooves 16 provide an increase in bonded surface area as well as the introduction of turbulent rubber flow as rubber flows into the groove in a non-parallel direction to the tube wall, to greatly reduce "sweeping" beyond the groove. The projecting portions 14A of the elastomeric seal body that are received in the recessed grooves 16 create a mechanical connection between the rigid cylindrical tube 12 and the elastomeric seal body 14. Each end of the elastomeric seal body 14 includes at least one raised seal bead portion 22 disposed generally radially outward from the recessed annular grooves 16. In order to benefit fully from the mechanical lock, the grooves in the insert are preferably located directly under the seal bead 22. The design of the present disclosure can be used in combination with or without adhesive between seal body 14 and tube 12.

Figure 4:
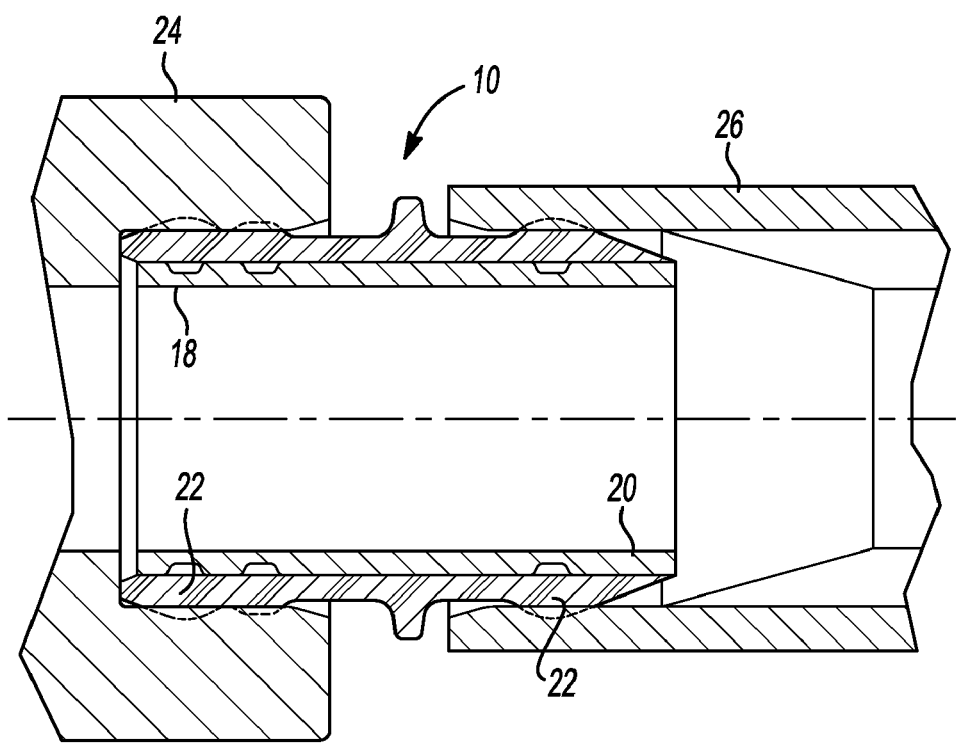
FIG. 4 is a cross-sectional view of the tube seal of FIG. 3 in an installed position.

As illustrated in FIG. 4, an exemplary tube seal 10 is shown connecting two tubular members 24, 26, with each of the ends 18, 20 being received in the tubular members 24, 26 such that the raised bead portions 22 are compressed and create a seal with an inner surface of the tubular members 24, 26.

Figure 5:
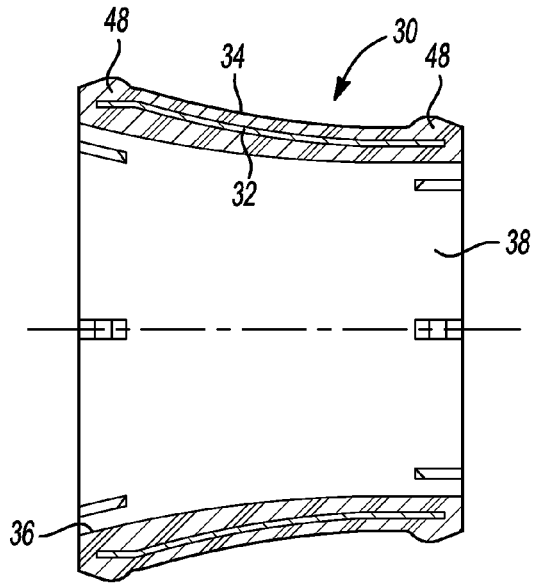
FIG. 5 is a cross-sectional view of a diameter reducing tube seal according to the principles of the present disclosure.
Figure 6:
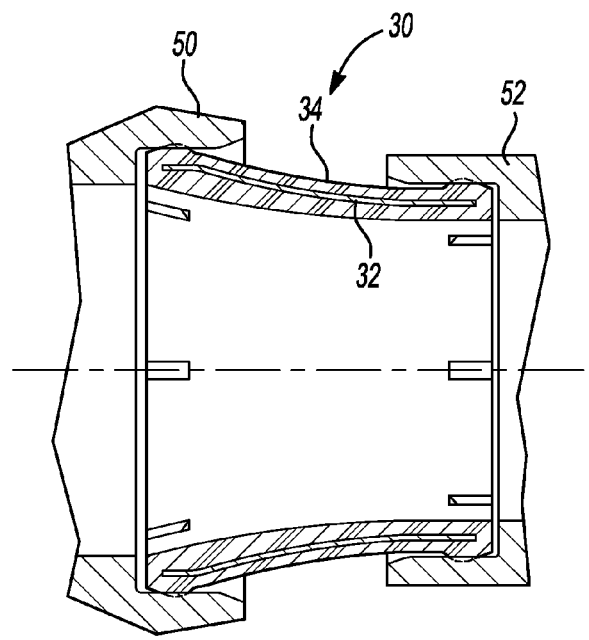
FIG. 6 is a cross-sectional view of a the tube seal of FIG. 5 in an installed position.
Figure 7:
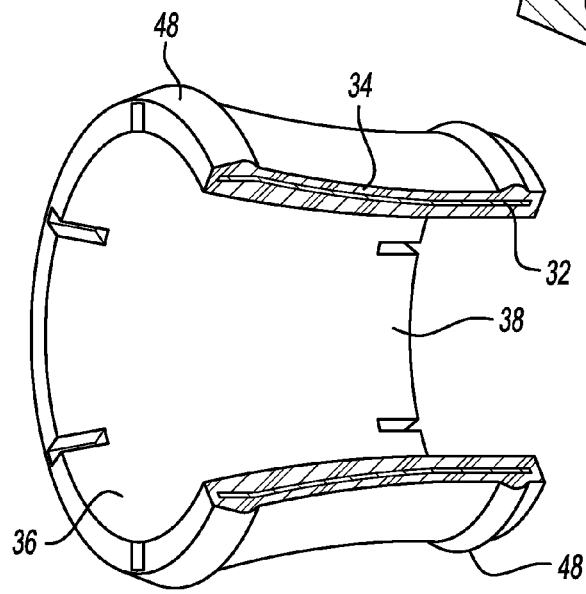
FIG. 7 is a perspective partially cut-away view of the tube seal of FIG. 5.

With reference to FIGS. 5-7, a diameter reducing tube seal 30 according to the principles of the present disclosure will now be described. The diameter reducing tube seal 30 includes a generally conically shaped rigid insert 32 and an elastomeric seal body 34 molded to inner and outer surfaces of the rigid conical insert 32. It should be understood that by "generally conically shaped," it is meant that the insert 32 can have curved walls or stepped walls, as shown, or can have straight walls.

Figure 8:
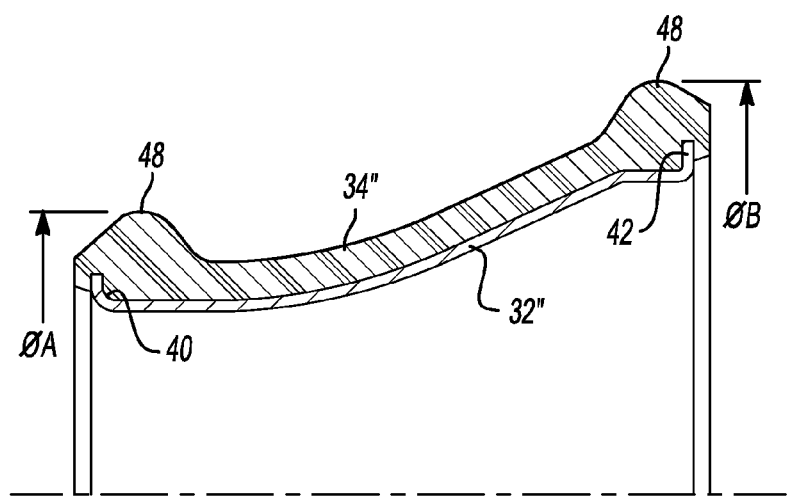
FIG. 8 is a cross-sectional view of a diameter reducing tube seal according to a second embodiment.
Figure 9:
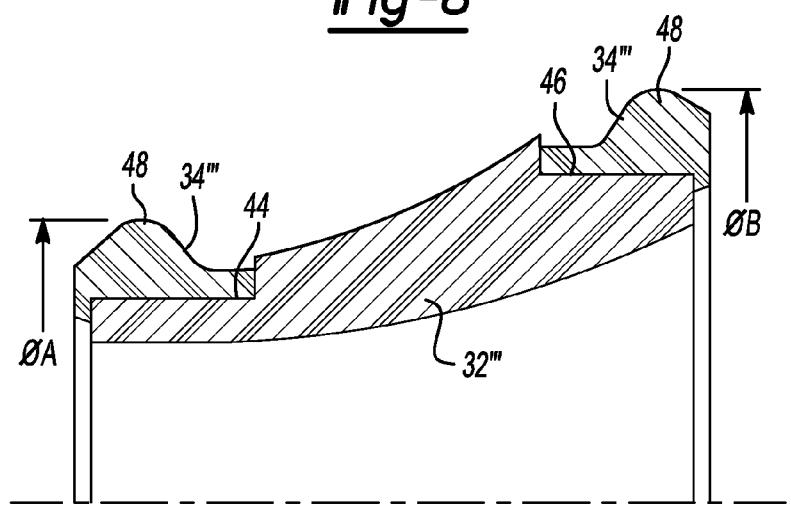
FIG. 9 is a cross-sectional view of a diameter reducing tube seal according to a third embodiment.
Figure 10:
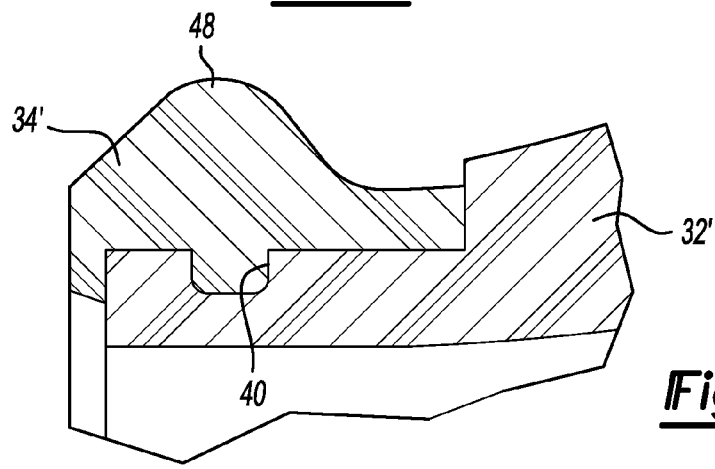
FIG. 10 is a cross-sectional view of a diameter reducing tube seal according to a fourth embodiment.

The metal conical insert 32 includes a first opening 36 at a first end and a second opening 38 at a second end, the first opening 36 is larger in diameter than the second opening 38. As illustrated in FIG. 10, the rigid insert 32' may include recessed annular grooves 40 for creating a mechanical connection with the seal body 34' and insert 32'. As yet another alternative embodiment, as shown in FIG. 8, the rigid insert 32' can include bent portions 40, 42 at the first and second ends with the seal body 34' over-molded over the bent portions 40, 42 thereby creating a mechanical connection. As still another embodiment as shown in FIG. 9, the rigid insert 32''' can be cast to include a reduced thickness portion 44, 46 at the first and second ends, with the elastomeric seal body 34''' being over-molded over the reduced thickness portions 44, 46 and wrapping at least partially around the ends to create a mechanical connection.

The elastomeric seal body 34 is molded to the rigid insert 32 so as to create a mechanical connection therebetween. The elastomeric seal body 34 includes annular raised bead portions 48 which, as shown in FIG. 6, are shown received in the end portions of tubular members 50, 52 which are of different diameters.

Figure 11:
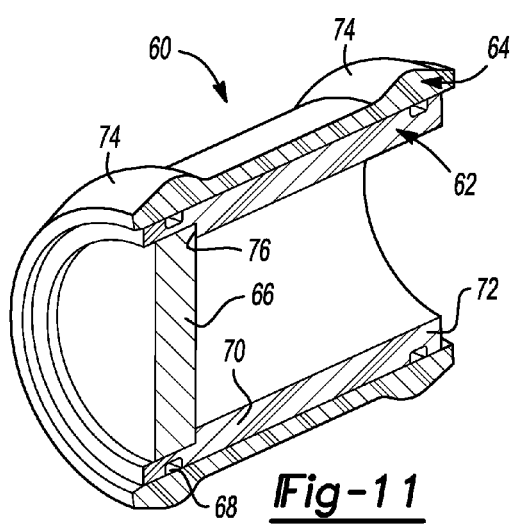
FIG. 11 is a perspective partially cut-away view of the tube seal with an integrated filter according to the principles of the present disclosure.
Figure 12:
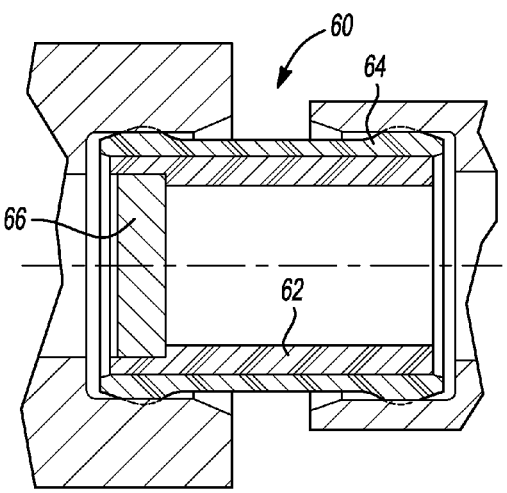
FIG. 12 is a cross-sectional view of the tube seal and integrated filter of FIG. 11, shown in an installed position.

With reference to FIGS. 11 and 12, a tube seal and integrated filter 60 will now be described. The tube seal and integrated filter 60 includes a rigid cylindrical tube 62 and an elastomeric seal body 64 molded to an outer surface of the rigid cylindrical tube 62. A filter member 66 is disposed in the rigid cylindrical tube 62.

The rigid cylindrical tube 62 can include one or more recessed annular grooves 68 in an outer surface thereof at each end 70, 72.

The elastomeric seal body 64 is molded to the rigid cylindrical tube 62 so as to be received in the recessed annular grooves 68. The elastomeric seal body 64 received in the recessed grooves 68 creates a mechanical connection between the rigid cylindrical tube 62 and the elastomeric seal body 64. Each end of elastomeric seal body 64 includes at least one raised seal bead portion 74 disposed generally radially outward from the recessed annular grooves 68.

Figure 13:
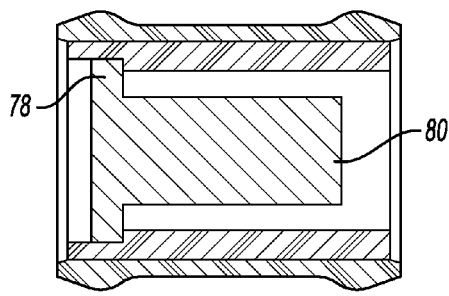
FIG. 13 is a cross-sectional view of a tube seal with an integrated filter according to a second embodiment.
Figure 14:
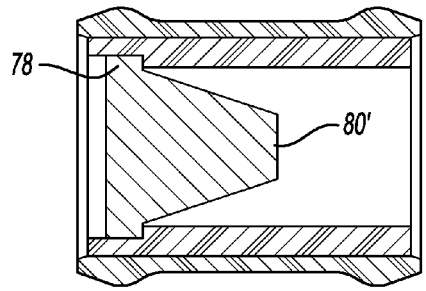
FIG. 14 is a cross-sectional view of a tube seal with an integrated filter according to a third embodiment.
Figure 15:
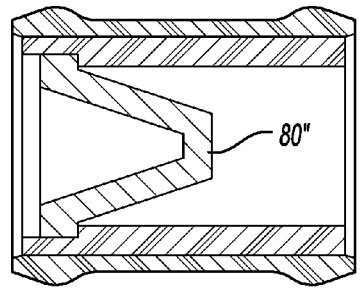
FIG. 15 is a cross-sectional view of a tube seal with an integrated filter according to a fourth embodiment.

The filter member 66 is disposed against a step portion 76 provided on an inner surface of the cylindrical tube 62. The filter member 66 can be have various shapes and can be made from various materials. By way of example, the filter member 66 can be formed from a porous material such as sintered metal, sintered ceramic or can be made from a screen, fabric, or other known filter material. The filter member 66 can also be disc-shaped as shown in FIGS. 11 and 12 or can have a disc-shaped base portion 78 with an extension portion 80, wherein the extension portion 80 can be cylindrical in shape, as shown in FIG. 13, or conical in shape 80', 80'', as shown in FIGS. 14 and 15. The extension portion 80 can also be hollow as shown in FIG. 15.

Figure 16:
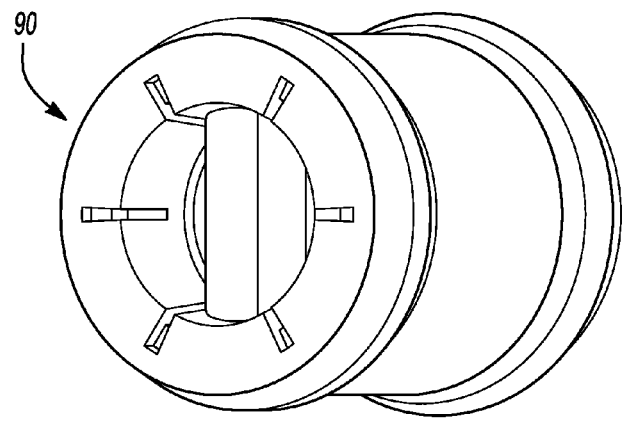
FIG. 16 is a perspective view of a tube seal with an integrated valve member according to the principles of the present disclosure.
Figure 17:
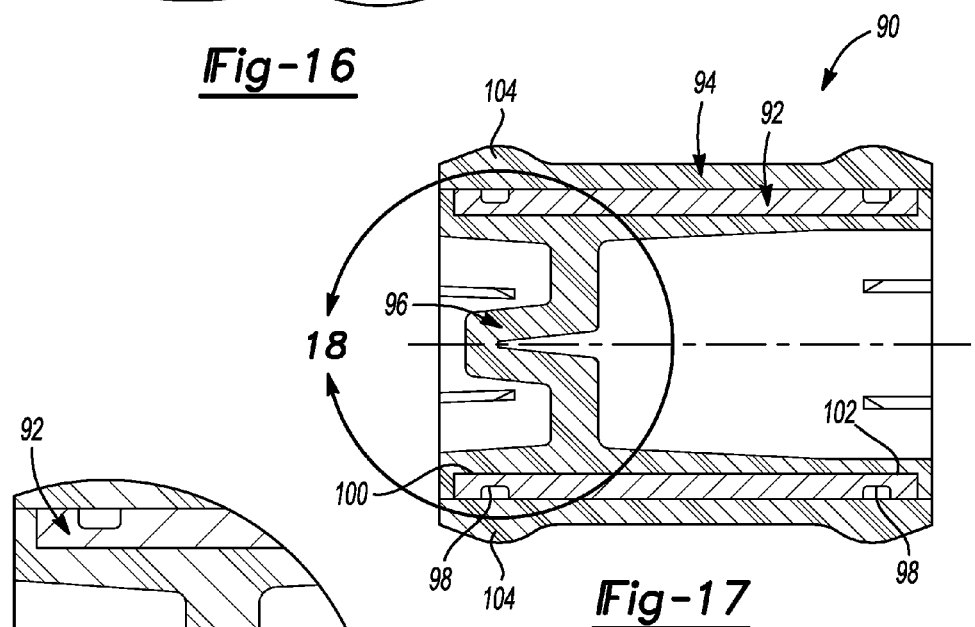
FIG. 17 is a cross-sectional view of the tube seal of FIG. 16.
Figure 18:
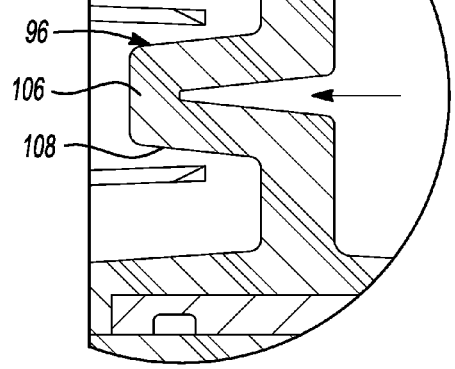
FIG. 18 is a detailed cross-sectional view of the valve member of the tube seal of FIG. 16.

With reference to FIGS. 16-18, a tube seal and integrated valve 90, will now be described. The tube seal and integrated filter 90 includes a rigid cylindrical tube 92 and an elastomeric seal body 94 molded to an outer surface of the rigid cylindrical tube 92. An integrally formed valve member 96 is disposed in the rigid cylindrical tube 92.

The rigid cylindrical tube 92 can include one or more recessed annular grooves 98 in an outer surface thereof at each end 100, 102.

The elastomeric seal body 94 is molded to the rigid cylindrical tube 92 so as to be received in the recessed annular grooves 98. The elastomeric seal body 94 received in the recessed grooves 98 creates a mechanical connection between the metal cylindrical tube 92 and the elastomeric seal body 94. Each end of elastomeric seal body includes at least one raised seal bead portion 104 disposed generally radially outward from the recessed annular grooves 98.

The valve member 96 is an elastomeric duck-bill valve that is molded inside of the rigid cylindrical tube 92. The duck bill valve 96 can serve as a pressure regulating valve or as a one-way flow control valve. The duck bill valve 96 includes a slit 106 in a protruding portion 108 that opens under a predetermined pressure applied thereto from the inside. By integrating the valve with the tube seal, the need for additional valve and connector elements can be avoided.

What is claimed is:

1. A diameter reducing tube seal, comprising:
a generally conically shaped rigid insert having a first opening at a first end and a second opening at a second end and first and second reduced thickness portions formed in an outer surface of said rigid insert at said respective first and second ends, said first opening being larger in diameter than said second opening, said first reduced thickness portion extending to a terminal end of said first end and said second reduced thickness portion extending to a terminal end of said second end; and
an elastomeric seal body molded to each of said first and second reduced thickness portions and extending beyond said respective terminal ends of said rigid insert, each elastomeric seal body including an annular raised bead portion surrounding said respective first and second openings.

2. The diameter reducing tube seal according to claim 1, wherein said rigid insert includes a recessed annular groove formed into an outer surface of said first and second reduced thickness portions at said first and second ends, said elastomeric seal body being received in said recessed annular grooves.

3. The diameter reducing tube seal according to claim 2, wherein said raised seal bead portions are disposed directly radially outward of said recessed annular grooves in said first and second reduced thickness portions.

4. The diameter reducing tube seal according to claim 1, wherein said rigid insert is cast to include said reduced thickness portions at said first and second ends, said elastomeric seal body being over-molded over said reduced thickness portions.

5. The diameter reducing tube seal according to claim 1, wherein said conically shaped rigid insert includes an inner surface extending between said first and second ends, said inner and outer surfaces each being conically shaped.

6. The diameter reducing tube seal according to claim 1, wherein said elastomeric seal body wraps around said terminal ends of said rigid insert.

7. A diameter reducing tube seal, comprising:
a conically shaped rigid insert having a first opening at a first end and a second opening at a second end, said first opening being larger in diameter than said second opening; and
an elastomeric seal body;
wherein said rigid insert includes a reduced thickness portion at said first and second ends that extend to terminal ends of said rigid insert, said elastomeric seal body being molded over said reduced thickness portions and extending to said terminal ends, said elastomeric seal body including raised annular bead portions surrounding said first and second openings, said reduced thickness portion being formed in an outer surface of said rigid insert.

8. The diameter reducing tube seal according to claim 7, wherein said conically shaped rigid insert includes an inner surface extending between said first and second ends, said inner and outer surfaces each being conically shaped.

9. The diameter reducing tube seal according to claim 7, wherein said elastomeric seal body extends beyond and wraps around said terminal end.

10. The diameter reducing tube seal according to claim 7, wherein said rigid insert includes a recessed annular groove provided in an outer surface of said at least one reduced thickness portion, said elastomeric seal body being received in said recessed annular groove.

11. The diameter reducing tube seal according to claim 10, wherein said raised seal bead portion is disposed directly radially outward of said recessed annular groove.

* * * * *